United States Patent [19]
Edenfield

[11] Patent Number: 5,688,469
[45] Date of Patent: Nov. 18, 1997

[54] GAS MIXER FOR CUTTING TORCHES

[75] Inventor: Randy C. Edenfield, Flowery Branch, Ga.

[73] Assignee: The Lincoln Electric Company, Cleveland, Ohio

[21] Appl. No.: 722,906

[22] Filed: Sep. 27, 1996

[51] Int. Cl.⁶ .................................................. B23K 7/00
[52] U.S. Cl. ............................................................ 266/48
[58] Field of Search .................................. 266/48, 49, 77

[56] References Cited

U.S. PATENT DOCUMENTS

| | | | |
|---|---|---|---|
| 804,002 | 11/1905 | Fouche | 266/48 |
| 1,703,750 | 2/1929 | Rose | |
| 1,726,327 | 8/1929 | Walker | |
| 1,940,343 | 12/1933 | Bennett et al. | |
| 4,022,441 | 5/1977 | Turney | |
| 4,248,384 | 2/1981 | Zwicker | |
| 4,409,002 | 10/1983 | Zwicker | |
| 4,431,167 | 2/1984 | Clarke | 266/48 |
| 4,443,003 | 4/1984 | Bleys | 266/77 |
| 4,509,689 | 4/1985 | Kuo | |

*Primary Examiner*—Scott Kastler
*Attorney, Agent, or Firm*—Vickers, Daniels & Young

[57] ABSTRACT

A fuel gas and preheat oxygen mixer for a gas torch comprises a bore in the torch head receiving a gas mixing insert having an axially thin peripheral gas mixing recess which receives preheat oxygen and fuel gas from corresponding manifold areas across radially thin metering passages. The gases are mixed in the mixing recess and delivered to the torch tip through delivery passages which, together with the mixing recess and metering passages provide gas flow paths having abrupt directional changes, all of which cooperatively resist flashbacks during use of the torch.

30 Claims, 2 Drawing Sheets

GAS MIXER FOR CUTTING TORCHES

BACKGROUND OF THE INVENTION

This invention relates to the art of gas burning torches and more particularly to an improved fuel gas and oxygen mixer for a cutting torch head.

Fuel gas-oxygen cutting torches are of course well known and generally comprise a torch head having outlet passages communicating with a torch tip through which a combustible gaseous mixture flows and is ignited and directed toward a workpiece. The torch further includes fuel gas and oxygen supply lines connected to corresponding sources of fuel gas and oxygen, and valves are provided for controlling the flow of fuel gas and oxygen to the torch head. Such torches have a preheat mode of operation in which the fuel gas and oxygen are combined in a mixer to provide a combustible mixture which flows to the torch head outlet and torch tip where the mixture is ignited to form a preheat flame which is used to heat a workpiece to a temperature which will support combustion. Such torches also have a cutting mode of operation wherein, following a preheat operation, cutting oxygen is supplied to the torch tip separate from the preheat combustible mixture to flow from the tip and cut the heated workpiece.

It was the function of the fuel gas-oxygen mixer to mix the fuel gas and oxygen components which are separately supplied thereto and to deliver the mixture to the torch tip in order to achieve uniform combustion efficiency throughout the flame resulting from igniting the combustible mixture at the tip. A further performance requirement with regard to fuel gas-oxygen mixers is to provide resistance to flashback resulting from a backfire occurring, for example, in response to contacting the torch tip with the workpiece. As is well known, such a backfire causes an explosion inside the torch between the point of mixing of the fuel gas and oxygen and the point of combustion of the mixture at the torch tip. If such backfiring results in sustained combustion inside the torch such sustained combustion is defined as flashback. Flashback can quickly destroy a torch and, accordingly, the fuel gas-oxygen mixer must be capable of handling backfires so as to avoid or optimize the resistance to flashback. Mixer designs heretofore available are structurally complex and undesirably expensive to manufacture and are difficult and/or time consuming to manufacture and assemble. Moreover, previous mixer designs are limited with respect to varying dimensional perimeters thereof without loss of structural stability and/or resistance to flashback. Mixer designs resulting from efforts to simplify the structures thereof have not been fully satisfactory with respect to addressing the foregoing problems and especially with regard to maintaining or improving the desired resistance to flashbacks.

SUMMARY OF THE INVENTION

In accordance with the present invention, a fuel gas-oxygen mixer is provided which is structurally simple, economical and easy to manufacture, and efficient with respect to resisting flashbacks. More particularly in this respect, the mixer is a one-piece insert which can be readily machined in a single manufacturing operation, thus optimizing the cost of manufacturing the mixer. Further, the mixer insert is adapted to be readily received in a bore therefor in the torch head and can be removably held in the bore by the torch tip or retained in the bore such as by brazing. Moreover, the structures of the insert and bore advantageously provide for the insert to be introduced into the bore without regard for a particular orientation relative thereto or to the torch tip, thus optimizing the ease of assembly of the head, mixer and tip components. Still further in accordance with the invention, the mixer insert includes a mixing recess or groove in which fuel gas and oxygen are mixed for delivery to the torch tip, and the mixing recess delivery passages and the fuel gas and oxygen inlet passages are structured and structurally interrelated so as to optimize resistance to the flashbacks. More particularly in this respect, the insert structure and orientation relative to the fuel gas and oxygen inlet passages provide narrow passageways for the flow of fuel gas and oxygen to the mixing recess, which also is preferably narrow, and a flow path from the fuel gas and oxygen inlet passages to the torch tip which includes abrupt directional changes. The narrow flow passages and abrupt directional changes in the flow path restrict reverse flow of gases toward the fuel gas and oxygen inlet passages when a backfire occurs, thus to optimize resistance to flashback.

It is accordingly an outstanding object of the present invention to provide an improved fuel gas and oxygen mixer for a gas burning torch.

Another object is the provision of a mixer of the foregoing character which is in the form of an insert received in a bore therefor in the torch head and which is structured and structurally interrelated with fuel gas and oxygen supply passages to the head in a manner which promotes resistance to flashbacks.

A further object is the provision of a mixer of the foregoing character which is of one-piece construction removably held in the torch head by the torch tip and having universal orientation with respect to the fuel gas and oxygen inlet passages and the torch tip, thus optimizing the ease of assembly of the component parts.

Still another object is the provision of a mixer of the foregoing character wherein the insert includes a mixing recess and the insert is structured and structurally interrelated with the fuel gas and oxygen inlet passages to define narrow gas flow passageways to the mixing recess and a flow path from the fuel gas and oxygen inlet passages to the torch tip characterized by abrupt directional changes to promote resistance to flashbacks.

Yet another object is the provision era mixer of the foregoing character which is structurally simple and easy to manufacture and assemble on the torch head and which is efficient in operation with respect to optimizing resistance to flashback.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
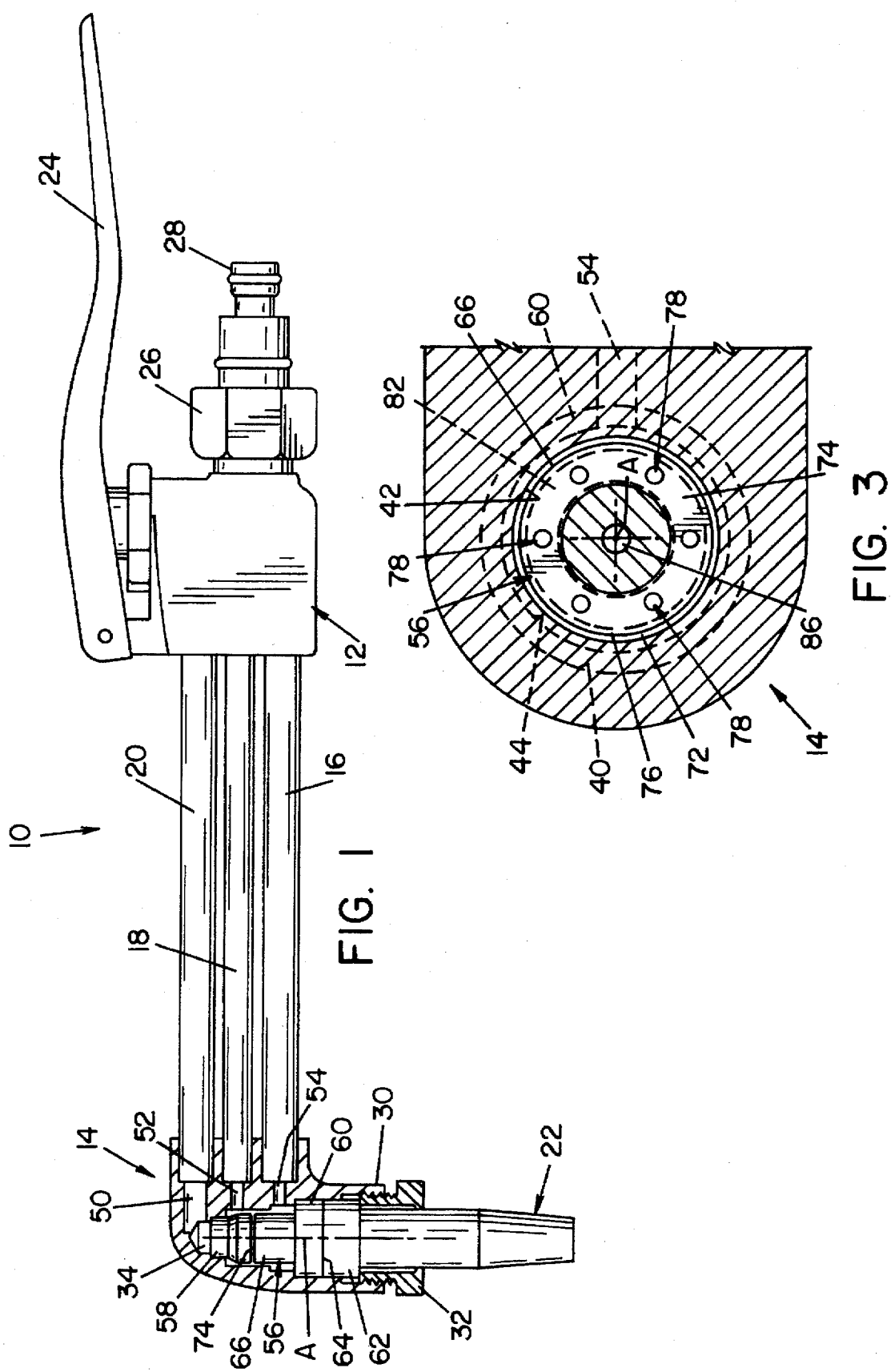
FIG. 1 is an elevation view, partially in section, of a gas burning torch incorporating a mixer in accordance with the present invention.

Referring now in greater detail to the drawings, wherein the showings are for the purpose of illustrating a preferred embodiment of the invention only and not for the purpose of limiting the invention, a gas burning torch 10 is illustrated in FIG. 1 which includes a valve housing 12 and a torch head 14 connected to the valve housing by a fuel gas supply tube 16, a preheat oxygen supply tube 18 and a cutting oxygen supply tube 20. The torch further includes a torch tip 22 and a valve operating lever 24 pivotally mounted on housing 12 for controlling the actuation of a valve, not shown, by which the flow of cutting oxygen through tube 20 to torch head 14 and tip 22 is controlled. Housing 12 includes coupling components 26 and 28 for connecting the torch to supplies of a fuel gas and oxygen, respectively, and the flow of fuel gas to tube 16 and preheat oxygen to tube 18 is controlled by manually adjustable valves, not shown. On some torches, the latter valves are provided on housing 12, and on other torches the valves are provided on a torch handle component connected to torch 10 by couplings 26 and 28.

Figure 2:
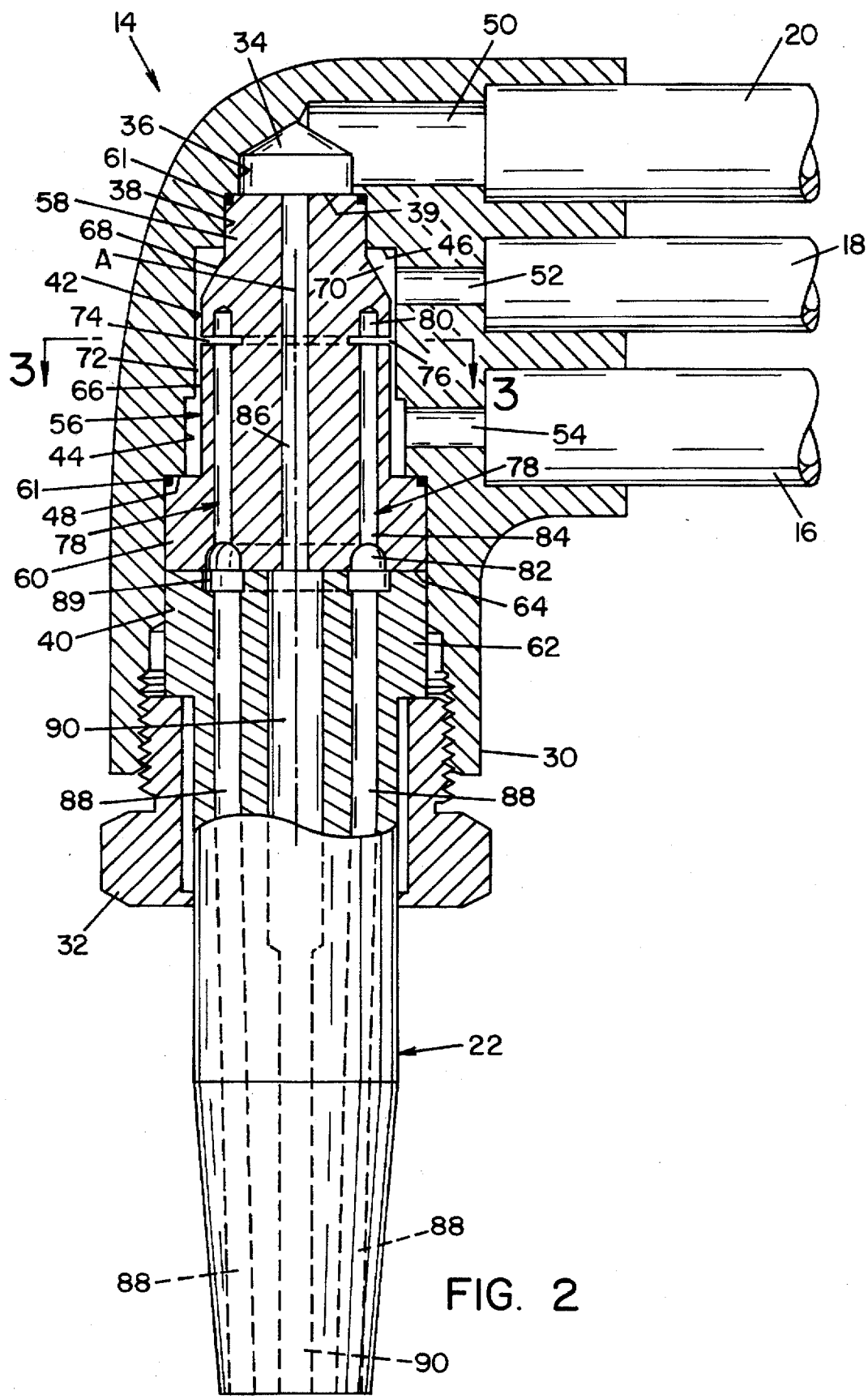
FIG. 2 is an enlarged sectional elevation view of the torch head and mixer insert illustrated in FIG. 1; and, FIG. 3 is plan view in section of the mixer taken along line 3—3 in FIG. 2.

Torch head 14 has a tip end 30 and a circular bore extending into the head therefrom and which is internally threaded at tip end 30 to receive an externally threaded annular tip nut 32 by which torch tip 22 is removably mounted on the torch head. In accordance with the present invention, and as best seen in FIGS. 2 and 3 of the drawing, the circular bore has an axis A and an axially inner end including a chamber 34, radially stepped circular inner surfaces 36 and 38, and a radially extending shoulder 39 between surfaces 36 and 38. The bore further includes an axially outer end inwardly adjacent tip end 30 and including circular inner surface 40 and an intermediate bore portion between the inner and outer ends of the bore and including circular inner surface 42 and radially inwardly open annular recess 44, which surface and recess serve the purposes set forth hereinafter. The bore further includes a radially extending wall 46 between surfaces 38 and 42 and a radially extending shoulder 48 between surface 40 and recess 44. A cutting oxygen passageway 50 opens radially into chamber 34 for supplying cutting oxygen to tip 22 as set forth more fully hereinafter, a preheat oxygen passageway 52 opens radially into the bore adjacent the inner end of surface 42, and a fuel gas passageway 54 opens radially into annular recess 44. The preheat oxygen and fuel gas are mixed in head 14 and delivered to torch tip 22 in the manner which will be become apparent hereinafter.

Further in accordance with the present invention, a circular one-piece mixing insert 56 is received in the bore coaxial with axis A and has an axially inner end 58 sealingly interengaging with surface 38 of the bore and axially engaging against shoulder 39. Insert 56 further has an axially outer end including a circular flange 60 sealingly interengaging with surface 40 of the bore and axially engaging against shoulder 48. Shoulders 39 and 48 axially position the insert in the bore and, in cooperation with surfaces 38 and 40 of the bore seal against leakage of gas axially across the corresponding end of the insert. Preferably, such sealing is enhanced by interposing silver brazing rings 61 in the outer corners of shoulders 39 and 48 and fusing the insert in place thereby during assembly with head 14. The inner end of torch tip 22 includes a peripheral flange 62 which abuts against axially outer end wall 64 of insert 56. Mixing insert 56 includes a circular outer surface 66 extending axially inwardly from flange 60, and a conical surface 68 converging axially and radially inwardly from the inner end of surface 66 to inner end 58 of the insert. Bore surfaces 42 and 46 and insert surface 68 cooperatively provide an annular preheat oxygen manifold 70 adjacent the inner end of the insert, and bore surface 42 and outer surface 66 of the insert are radially spaced apart to provide a radially narrow annular metering passage 72 therebetween. Metering passage 72 is in communication at its upper end with preheat oxygen manifold 70 and at its lower end with recess 44 which provides an annular fuel gas manifold adjacent the outer end of the insert. Insert 56 is further provided with a radially outwardly open, axially narrow gas mixing recess in the form of a peripheral groove or slot 74 having parallel, axially spaced walls, not designated numerically. Recess 74 is in a plane transverse to axis A and has a gas inlet end 76 opening into metering passage 72 axially between annular manifolds 44 and 70 and thus axially between preheat oxygen and fuel gas passageways 52 and 54. Accordingly, it will be appreciated that metering passage 72 has two parts one of which is between manifold 70 and gas inlet end 76 of recess 74 and the other of which is between manifold 44 and gas inlet end 76 of the recess. Both portions of the metering passage are axially longer than the axial width of gas inlet end 76 of the recess, and the fuel gas portion is axially longer than the preheat oxygen portion.

Mixing insert 56 further includes a plurality of axially extending delivery or outlet passages 78 which are radially spaced from axis A and circumferentially spaced apart thereabout and each of which has an upper end 80 intersecting and thus in flow communication with mixing recess 74. Outer end wall 64 of flange 60 of insert 56 is provided with an axially inwardly extending annular mixed gas manifold 82, and each of the delivery passages 78 has an outer end 84 opening into manifold 82. Finally, insert 56 includes an axially extending cutting oxygen delivery passage 86 extending centrally therethrough and having an upper end in flow communication with chamber 34 and a lower end opening through end wall 64 of insert flange 60. Tip 22, in a well known manner, includes a plurality of preheat delivery passages 88 circumferentially spaced apart about the axis thereof and a cutting oxygen passageway 90. Passages 88 open into a manifold 89 which is in alignment with mixed gas manifold 82, and cutting oxygen passage 90 is coaxial with cutting oxygen passageway 86 through insert 56. The structure of mixing insert 56 including the annular mixed gas manifold 82 at the outer end thereof advantageously provides for assembly of the insert with the bore in torch head 14 without regard for any particular orientation of the insert circumferentially of the bore and, likewise, without any particular orientation of tip 22 relative to the insert in that the manifolds 82 and 89 are radially aligned. Thus, the ease of assembly and disassembly of the insert and tip relative to the torch head is greatly facilitated. Moreover, as will be appreciated from FIG. 2 and the description herein, the structure of insert 56 advantageously provides for the latter to be quickly and easily manufactured through a single operation such as on a multiple turret wherein the cylindrical machining, radial grooving and axial grooving and drilling operations can be performed during a single cycle operation of the machine.

In operation, when the torch operator opens the fuel gas and oxygen supplies, preheat oxygen flows into the preheat oxygen manifold 70 through delivery tube 18 and passageway 52 and is metered through annular metering passage from manifold 70 to entrance end 76 of gas mixing recess 74. At the same time, fuel gas flows into fuel gas manifold 44 through delivery tube 16 and passageway 54 and is metered through the annular metering passage from manifold 44 to entrance end 76 of the mixing recess. The fuel gas and preheat oxygen enter and mix in mixing recess 74 and flow thereabout, and the mixed gases flow from the mixing recess into the delivery passages 78 wherein further mixing takes place. Delivery passages 78 intersect gas mixing recess 74 between the radially outer and inner ends thereof, and inner ends 80 of passages 78 extend inwardly of or above the gas mixing recess. These structural characteristics promote commingling of the fuel gas and preheat oxygen entering gas mixing recess 74 so as to optimize the mixing thereof which takes place prior to flow into delivery passages 78. The mixed gases flow through passages 78 into mixed gas manifold 82 from which the mixed gases are distributed and flow through the preheat delivery holes 88 to the exit end of tip 22 where the mixed gases are ignited to form a preheat flame for heating a workpiece to a temperature for cutting. When the cutting temperature is reached, the operator depresses valve operating lever 24 whereupon cutting oxygen enters chamber 34 through delivery tube 20 and passageway 50 and flows through cutting gas passage 86 in insert 56 and cutting gas hole 90 in tip 22, separate from the combustible gas mixture, to flow from the tip to cut the heated workpiece.

As will be appreciated from FIG. 2 and the foregoing description, the flow paths for fuel gas and preheat oxygen from delivery tubes 16 and 18 to delivery passages 78 in insert 56 include abrupt directional changes between axial and radial directions of flow and this, together with the radially narrow metering passage 72 and the axially narrow gas mixing recess 74, promotes resistance to flashback. With regard to the latter dimensional characteristics, in the illustrated embodiment, the annular metering passage 72 has a radial dimension of about 0.002 inch, and gas mixing recess 74 has an axial width of about 0.015 inch and a radial depth of about 0.120 inch. Thus, while the radial dimension of metering passage 72 is exaggerated in FIG. 2 for purposes of clarity, it will be appreciated that the dimensions of the latter and gas mixing recess 74 together with the abrupt directional changes in the gas flow paths provide considerable restriction to gas flow in response to a backfire and thus resistance to flashbacks. At the same time, it will be appreciated that the structure of insert 56 advantageously allows for dimensional variations without loss of structural integrity or stability or loss of resistance to flashbacks.

While considerable emphasis has been placed herein on the structure and structural interrelationships between the component parts of a preferred embodiment of the fuel gas and preheat oxygen mixer, it will be appreciated that other embodiments of the invention can be made and that many changes can be made in the preferred embodiment without departing from the principles of the invention. Accordingly, it is to be distinctly understood that the foregoing descriptive matter is to be interpreted merely as lustrative of the invention and not as a limitation.

Having thus described the invention, it is claimed:

1. In a gas torch head having a tip end for attaching a tip thereto, mixing means for delivering a mixture of fuel gas and oxygen to said tip, fuel gas passageway means for delivering a fuel gas to said mixing means, and oxygen passageway means for delivering oxygen to said mixing means, the improvement comprising: said mixing means comprising a bore extending into said head from said tip end and having an axis and an inner end axially spaced from said tip end, said fuel gas passageway means and said oxygen passageway means opening laterally into said bore at axially spaced locations, an insert in said bore coaxial therewith and having an outlet end facing said tip end, outlet passageway means extending axially into said insert from said outlet end, a peripheral mixing recess in said insert in flow communication with said outlet passageway means and having a radially outer end in flow communication with said bore between said locations.

2. The improvement according to claim 1, wherein said mixing recess includes a peripheral slot transverse to said axis.

3. The improvement according to claim 2, wherein said slot has a radially inner end and said outlet passageway means intersect said slot between said ends thereof.

4. In a gas torch head having a tip end for attaching a tip thereto, mixing means for delivering a mixture of fuel gas and oxygen to said tip, fuel gas passageway means for delivering a fuel gas to said mixing means, and oxygen passageway means for delivering oxygen to said mixing means, the improvement comprising: said mixing means comprising a bore extending into said head from said tip end having an axis and an inner end axially spaced from said tip end, said fuel gas passageway means and said oxygen passageway means opening into said bore at axially spaced locations, an insert in said bore coaxial therewith and having an outlet end facing said tip end, outlet passageway means extending axially into said insert from said outlet end, and a mixing recess in said insert in flow communication with said outlet passageway means and in flow communication with said bore between said locations, said mixing recess including a peripheral slot transverse to said axis, said slot having radially outer and inner ends, and said outlet passageway means including a plurality of passages radially spaced from and circumferentially spaced apart about said axis and intersecting said slot between said ends thereof.

5. The improvement according to claim 4, wherein said insert includes annular recess means extending axially inwardly from said outlet end thereof and said passages have outlet ends opening into said annular recess.

6. The improvement according to claim 3, wherein said slot has axially spaced apart sides and said radially inner and outer ends are spaced apart a distance greater than the space between said sides.

7. The improvement according to claim 1, wherein said mixing recess includes an axially narrow peripheral slot extending radially inwardly of said insert.

8. In a gas torch head having a tip end for attaching a tip thereto, mixing means for delivering a mixture of fuel gas and oxygen to said tip, fuel gas passageway means for delivering a fuel gas to said mixing means, and oxygen passageway means for delivering oxygen to said mixing means, the improvement comprising: said mixing means comprising a bore extending into said head from said tip end and having an axis and an inner end axially spaced from said tip end, said fuel gas passageway means and said oxygen passageway means opening into said bore at axially spaced locations, an insert in said bore coaxial therewith and having an outlet end facing said tip end, outlet passageway means extending axially into said insert from said outlet end, and a mixing recess in said insert in flow communication with said outlet passageway means and in flow communication with said bore between said locations, said mixing recess including an axially narrow peripheral slot extending radially inwardly of said insert, and said outlet passageway means including a plurality of passages radially spaced from and circumferentially spaced apart about said axis.

9. The improvement according to claim 8, wherein said slot has radially outer and inner ends and said passages intersect said slot between said ends thereof.

10. The improvement according to claim 9, wherein said insert includes annular recess means extending axially inwardly from said outlet end thereof and said passages have outlet ends opening into said annular recess.

11. In a gas torch head having a tip end for attaching a tip thereto, mixing means for delivering a mixture of fuel gas and oxygen to said tip, fuel gas passageway means for delivering a fuel gas to said mixing means, and oxygen passageway means for delivering oxygen to said mixing means, the improvement comprising: said mixing means comprising a bore extending into said head from said tip end and having an axis and an inner end axially spaced from said tip end, said fuel gas passageway means and said oxygen passageway means opening into said bore at axially spaced locations, an insert in said bore coaxial therewith and having an outlet end facing said tip end, outlet passageway means extending axially into said insert from said outlet end, and a mixing recess in said insert in flow communication with said outlet passageway means and in flow communication with said bore between said locations, said bore having an inner surface and said insert having an outer surface facing said inner surface, said mixing recess having an inlet end opening into said outer surface, said fuel gas passageway means and said oxygen passageway means opening through said inner surface at said bore, said inner and outer surfaces being radially spaced apart between said inlet end and said fuel gas passageway means to provide a fuel gas metering passage and between said inlet end and said oxygen passageway means to provide an oxygen metering passage for respectively metering flow of fuel gas and oxygen to said mixing recess from the corresponding one of said fuel gas passageway means and oxygen passageway means.

12. The improvement according to claim 11, wherein said inlet end of said recess is axially closer to said oxygen passageway means then to said fuel gas passageway means.

13. The improvement according to claim 11, and means providing fuel gas manifold means between said inner and outer surfaces, said fuel gas metering passage being between said fuel gas manifold means and said inlet end of said recess.

14. The improvement according to claim 13, wherein said fuel gas manifold means is in said inner surface of said bore.

15. The improvement according to claim 11, and means providing oxygen manifold means between said inner and outer surfaces, said oxygen metering passage being between said oxygen manifold means and said inlet end of said recess.

16. The improvement according to claim 15, and means providing fuel gas manifold means between said inner and outer surfaces, said fuel gas metering passage being between said fuel gas manifold means and said inlet end of said recess.

17. The improvement according to claim 11, wherein said mixing recess includes a peripheral slot in said outer surface of said insert having axially opposed sides spaced apart a given distance and having a radially outer end providing said inlet end, and each said fuel gas metering passage and oxygen metering passage having an axial length greater than said given distance.

18. The improvement according to claim 17, wherein said fuel gas metering passage has an axial length greater than the axial length of said oxygen metering passage.

19. The improvement according to claim 18, wherein said inner surface of said bore includes a radially inwardly open annular recess cooperable with a first portion of said outer surface of said insert to provide an annular fuel gas manifold, and said outer surface of said insert includes a second portion cooperable with a portion of said inner surface of said bore to provide an annular oxygen manifold, said fuel gas manifold and said oxygen manifold being in flow communication respectively with said fuel gas metering passage and said oxygen metering passage.

20. The improvement according to claim 19, wherein said oxygen passageway means is first oxygen passageway means and said head includes second oxygen passageway means opening into said inner end of said bone, and said insert having an axially inner end and an oxygen outlet passage extending axially therethrough from said inner end to said outlet end for delivering oxygen from said second oxygen passageway means to said outlet end.

21. In a gas torch head having a tip end for attaching a tip thereto, mixing means for delivering a mixture of fuel gas and oxygen to said tip, fuel gas passageway means for delivering a fuel gas to said mixing means, and oxygen passageway means for delivering oxygen to said mixing means, the improvement comprising: said mixing means comprising a circular bore extending into said head from said tip end and having an axis and an inner end axially spaced from said tip end, a circular gas mixing insert in said bore coaxial therewith and having an axially inner end in radially sealing interengagement with said inner end of said bore and having an outlet end in radially sealing interengagement with said bore intermediate said inner end thereof and said tip end of said head, said outlet end of said insert including an end wall facing said tip end, said insert having an outer surface between said inner and outlet ends and a radially outwardly open annular gas mixing recess in a portion of said outer surface, said bore including surface portions on axially opposite sides of said recess and radially spaced from said outer surface portion of said insert to provide first and second annular gas metering passages in flow communication with said gas mixing recess, said fuel gas passageway means opening radially into said bore for delivering fuel gas to said mixing recess through said first metering passage, said oxygen passageway means opening radially into said bore for delivering oxygen to said mixing recess through said second metering passage, and a plurality of outlet passages in said insert extending from said mixing recess through said end wall thereof for delivering a mixture of said fuel gas and oxygen from said mixing recess to said outlet end of said insert.

22. The improvement according to claim 21, wherein said bore and said insert include radially opposite surface portions providing first and second annular gas manifold passages, each of said first and second metering passages having an inlet end axially spaced from said mixing recess and respectively in flow communication with said first and second manifold passages.

23. The improvement according to claim 22, wherein said inlet end of said second metering passage is closer to said gas mixing recess than is the inlet end of said first metering passage.

24. The improvement according to claim 21, wherein said mixing recess has radially extending axially spaced walls providing said recess with an axial dimension of about 0.015 inch and a radial dimension of about 0.120 inch.

25. The improvement according to claim 21, wherein said first and second metering passages have the same radial dimension.

26. The improvement according to claim 25, wherein said radial dimension is about 0.002 inch.

27. The improvement according to claim 26, wherein said mixing recess has radially extending axially spaced walls providing said recess with an axial dimension of about 0.015 inch and a radial dimension of about 0.120 inch.

28. The improvement according to claim 27, wherein said bore and said insert include radially opposite surface portions providing first and second annular gas manifold passages, each of said first and second metering passages having an inlet end axially spaced from said mixing recess and respectively in flow communication with said first and second manifold passages.

29. The improvement according to claim 21, wherein said end wall of said insert includes an annular recess extending axially inwardly thereof, said outlet passages having outlet ends opening into said annular recess.

30. The improvement according to claim 29, wherein said oxygen passageway means is first oxygen passageway means and said head includes second oxygen passageway means opening into said inner end of said bore, and an oxygen outlet passage extending axially through said insert from said inner end thereof to said outlet end for delivering oxygen from said second oxygen passageway means to said outlet end.

* * * * *